(12) United States Patent
Helm et al.

(10) Patent No.: US 9,924,088 B2
(45) Date of Patent: Mar. 20, 2018

(54) CAMERA MODULE

(71) Applicant: LG ELECTRONICS INC., Seoul (KR)

(72) Inventors: Peter Helm, Seoul (KR); James Khatiblou, Seoul (KR); Timothy Seward, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/181,016

(22) Filed: Jun. 13, 2016

(65) Prior Publication Data

US 2017/0272641 A1 Sep. 21, 2017

(30) Foreign Application Priority Data

Mar. 16, 2016 (KR) .................. 10-2016-0028427

(51) Int. Cl.

| | |
|---|---|
| *H04N 5/232* | (2006.01) |
| *H04N 5/225* | (2006.01) |
| *H04N 1/00* | (2006.01) |
| *G06F 3/0488* | (2013.01) |
| *G06F 3/0484* | (2013.01) |
| *H04N 5/222* | (2006.01) |

(52) U.S. Cl.
CPC ..... *H04N 5/23206* (2013.01); *G06F 3/04842* (2013.01); *G06F 3/04883* (2013.01); *H04N 1/00307* (2013.01); *H04N 5/2254* (2013.01); *H04N 5/23216* (2013.01); *H04N 5/23296* (2013.01)

(58) Field of Classification Search
CPC ............... H04N 5/232; H04N 5/23216; H04N 1/00384; H04N 1/00411; G06F 3/033
USPC ... 348/211.99, 211.7, 211.8, 333.02, 333.09, 348/373
See application file for complete search history.

(56) References Cited

U.S. PATENT DOCUMENTS

| | | | |
|---|---|---|---|
| 6,195,122 B1 * | 2/2001 | Vincent | G01C 11/02 348/169 |
| 2012/0188441 A1 | 7/2012 | Takizawa | |
| 2013/0321656 A1 * | 12/2013 | Ducharme | H04N 5/23203 348/211.1 |
| 2015/0312468 A1 | 10/2015 | Taylor et al. | |
| 2015/0324643 A1 | 11/2015 | Lambert et al. | |
| 2016/0171330 A1 * | 6/2016 | Mentese | G06K 9/3233 348/170 |

FOREIGN PATENT DOCUMENTS

| | | |
|---|---|---|
| JP | 2013-143760 A | 7/2013 |
| WO | WO 2013/191962 A1 | 12/2013 |

* cited by examiner

*Primary Examiner* — Kelly L Jerabek
(74) *Attorney, Agent, or Firm* — Birch, Stewart, Kolasch & Birch, LLP

(57) ABSTRACT

A camera module including a main body having a spherical shape and including a camera; a first arm connected to the main body and including a first motor configured to rotate the main body; a second arm connected to the first arm and including a second motor configured to rotate the first arm; a fixing member connected to the second arm and including a third motor for rotating the second arm; and a controller configured to independently rotate the main body, the first arm and the second arm to allow omnidirectional capturing in a three-dimensional space where the camera is placed.

15 Claims, 9 Drawing Sheets

(a)  (b)

(c1)   (c2)   (c3)

(c)

CAMERA MODULE

CROSS-REFERENCE TO RELATED APPLICATION

Pursuant to 35 U.S.C. § 119(a), this application claims the benefit of an earlier filing date of and the right of priority to Korean Patent Application No. 10-2016-0028427, filed on Mar. 9, 2016, the contents of which are incorporated by reference herein in its entirety.

BACKGROUND OF THE INVENTION

1. Field of the Invention

This specification relates to a camera module having various capturing directions.

2. Background of the Invention

Terminals may be divided into mobile/portable terminals and stationary terminals. Also, the mobile terminals may be classified into handheld terminals and vehicle mount terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can capture still images or moving images, play music or video files, play games, receive broadcast and the like, so as to be implemented as an integrated multimedia player. To support or enhance various functions of such mobile terminals, many efforts are made. Such many efforts include not only changes and improvement of structural components implementing a mobile terminal but also software or hardware improvement.

In recent time, developments of a camera which can be used by being detached from or operably attached to a terminal body and a gimbal supporting the camera are actively conducted. The related art camera gimbal has problems that different arms for rotating a mounted camera interfere with a viewing angle of the camera while they are rotated and sometimes collide with each other. Also, due to an installation space of such different anus of the gimbal, an entire volume of the camera module disadvantageously increases.

SUMMARY OF THE INVENTION

Therefore, an aspect of the detailed description is to provide a camera module capable of capturing all directions within a compact space.

To achieve these and other advantages and in accordance with the purpose of this specification, as embodied and broadly described herein, there is provided a camera module a main body formed in a spherical shape and provided with a camera for capturing an external environment, a first arm connected to the main body and provided with a first motor for rotating the main body, a second arm connected to the first arm and provided with a second motor for rotating the first arm, and a fixing member connected to the second arm and provided with a third motor for rotating the second arm, wherein the main body, the first arm and the second arm are independently rotatable to allow omnidirectional capturing in a three-dimensional space where the camera is placed.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
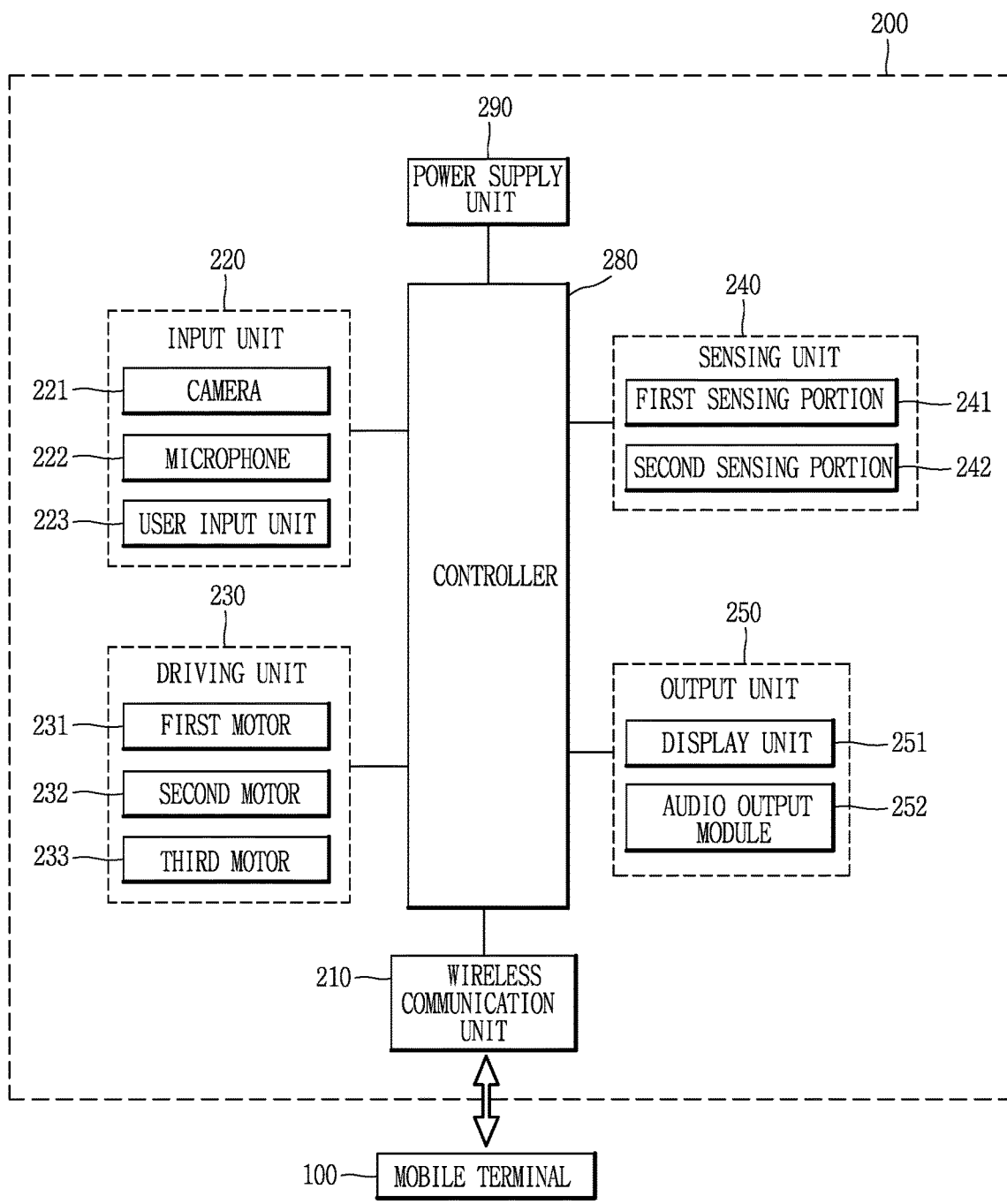
FIG. 1 is a block diagram of a camera module according to an embodiment of the present invention.
Figure 2:
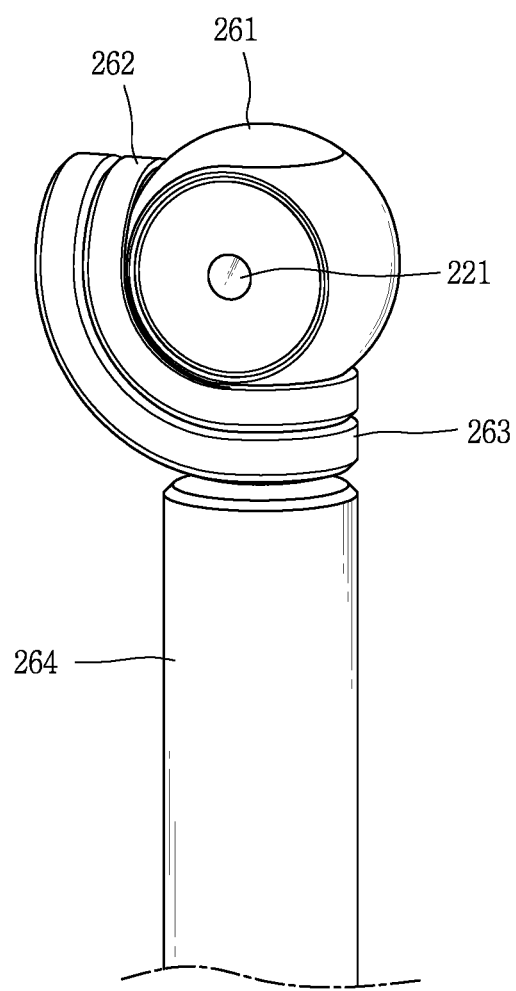
FIG. 2 is a view illustrating that the camera module is arranged in a first state according to an embodiment of the present invention.

FIG. 1 is a block diagram of a camera module 200 and FIG. 2 is a view illustrating that the camera module is arranged in a first state according to an embodiment of the present invention As shown, the camera module 200 may include a wireless communication unit 210, an input unit 220, a driving unit 230, a sensing unit 240, an output unit 250, an interface unit 260, a memory 270, a controller 280, a power supply unit 290, and the like. Implementing all of the illustrated components is not a requirement, and that greater or fewer components may alternatively be implemented.

In more detail, the wireless communication unit 210 may typically include one or more modules which permit communications such as wireless communications between the camera module 200 and a wireless communication system, communications between the camera module 200 and another mobile terminal, or communications between the camera module 200 and an external server. Also, the wireless communication unit 210 may include one or more modules connecting the camera module 200 to one or more networks.

The wireless communication unit 210 may also perform data transmission and reception with a mobile terminal 100. In more detail, an image captured by the camera module 200 may be transmitted to the mobile terminal 100 through the wireless communication unit 210. Also, information related to a user request input in the mobile terminal 100 may be transmitted to the camera module 200 through the wireless communication unit 210.

The wireless communication unit 210 may include one or more of a broadcast receiving module 211, a mobile communication module 212, a wireless Internet module 213, a short-range communication module 214, and a location information module 215.

The input unit 220 may include a camera 221 or an image input unit for obtaining images or video, a microphone 222, which is one type of audio input device for inputting an audio signal, and a user input unit 223 (for example, a touch key, a mechanical key, and the like) for allowing a user to input information. Data (for example, audio, video, image, and the like) may be obtained by the input unit 220 and may be analyzed and processed according to user commands.

Here, the camera 221 can acquire images of surrounding environments of the camera module 200. The images acquired in the camera 221 may be transmitted to the mobile terminal 100 through the wireless communication unit 210. In addition, the camera module 200 may also include a plurality of cameras.

The microphone 222 processes an external audio signal into electric audio (sound) data. The processed audio data may be transmitted to the mobile terminal 100 through the wireless communication unit 210.

The user input unit 223 is a component that permits input by a user. When information is input through the user input unit 223, the controller 280 can control an operation of the camera module 200 to correspond to the input information. For example, the user input unit 223 may include volume adjustment buttons provided on a main body, a power button, and the like. The controller 280 can control a battery of the power supply unit 290 to supply power to each of detailed components of the camera module 200 when information is input through the power button.

The driving unit 230 may apply an electronic force or mechanical physical force in order to rotate or move components of the camera module 200. In more detail, the driving unit 230 may include motors for rotating components, which define appearance of the camera module 200, centering on one axis. Detailed operations of the motors will be described in detail with reference to FIG. 2.

The sensing unit 240 may include one or more sensors for sensing at least one of information within the camera module 200, surrounding environment information of the camera module 200 and user information. For example, the sensing unit 240 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 221), a microphone 222, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The camera module disclosed herein may be configured to utilize information obtained from one or more sensors, and combinations thereof.

The sensing unit 240 may include first and second sensing portions 241 and 242 mounted to a rotatable portion and a fixed portion of the camera module 200, respectively. The first and second sensing portions may sense motions of the rotatable portion and the fixed portion of the sensing module 200, respectively, and each of the first and second sensing portions may be implemented as one of the acceleration sensor, the G-sensor and an inertia sensor, or a combination thereof.

The output unit 250 may typically be configured to output various types of information, such as audio, video, tactile output, and the like. The output unit 250 may be shown having at least one of a display module 251, an audio output module 252, a haptic module 253, and an optical output module 254.

The display module 251 may have an inter-layered structure or an integrated structure with a touch sensor in order to facilitate a touch screen. The touch screen may provide an output interface between the camera module 200 and a user, as well as function as the user input unit 223 which provides an input interface between the camera module 200 and the user.

The interface unit 260 serves as an interface with various types of external devices that can be coupled to the camera module 200. The interface unit 260, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the camera module 200 may perform assorted control functions associated with a connected external device, in response to the external device being connected to the interface unit 260.

The memory 270 may store data to support various functions or features of the camera module 200. For instance, the memory 270 may be configured to store application programs executed in the camera module 200, data or instructions for operations of the camera module 200, and the like. Some of these application programs may be downloaded from an external server via wireless communication. Other application programs may be installed within the camera module 200 at time of manufacturing or shipping, which is typically the case for basic functions of the camera module 200 (for example, receiving a call, placing a call, receiving a message, sending a message, and the like). It is common for application programs to be stored in the memory 270, installed in the camera module 200, and executed by the controller 280 to perform an operation (or function) for the camera module 200.

The controller 280 typically functions to control overall operation of the camera module 200, in addition to the operations associated with the application programs. The controller 280 can provide or process information or functions appropriate for a user by processing signals, data, information and the like, which are input or output by the aforementioned various components, or activating application programs stored in the memory 270.

Also, the controller 280 controls some or all of the components illustrated in FIG. 1 according to the execution of an application program that have been stored in the memory 270. In addition, the controller 280 can control at least two of those components included in the mobile terminal to activate the application program.

The power supply unit 290 can be configured to receive external power or provide internal power in order to supply appropriate power required for operating elements and components included in the camera module 200. The power supply unit 290 may include a battery, and the battery may be configured to be embedded in the terminal body, or configured to be detachable from the body.

At least part of the components may cooperatively operate to implement an operation, a control or a control method of a camera module according to various embodiments disclosed herein. Also, the operation, the control or the control method of the camera module may be implemented on the camera module by an activation of at least one application program stored in the memory 270.

So far, the components of the camera module 200 disclosed herein have been described. Hereinafter, the structure of the camera module 200 according to an embodiment of the present invention will be described with reference to FIG. 2.

As illustrated in FIG. 2, the camera module 200 according to an embodiment of the present invention includes a main body 261, and a camera 221 disposed on the main body 261. The main body 261 may define appearance of the camera module 200.

In more detail, the main body 261 may generally be formed in a spherical shape. Here, the generally-formed spherical shape may refer to a shape in which at least part forms a part of a sphere. In this instance, a part of the main body 261 may have a flat shape, and another part thereof may have a spherical shape.

In addition, an inner space of the main body 261 may be provided with at least some of the components of the camera module 200. For example, at least some (e.g., an optical system, an image sensor, etc.) of components forming the camera 221 is disposed within the main body 261. In this instance, an incident surface for guiding external light into the camera 221 may be formed on the main body 261 corresponding to the inner space within the camera 221. The incident surface may be a lens itself or protective glass for protecting the lens.

In addition, the main body 261 may be rotatable in an omnidirectional manner such that the camera 221 mounted on the main body 261 can capture images in every direction. Here, every direction refers to all the directions on a three-dimensional space where the camera 221 is placed. To implement this, as illustrated in FIG. 2, the camera module 200 may include first and second arms 262 and 263 and a fixing member 264.

Hereinafter, a relative arrangement of the main body 261, the first and second arms 262 and 263 and the fixing member 264 will be described first, and then each coupling relationship will be described. Referring to FIG. 2, the first arm 262 may be formed in a curved shape to surround at least part of the main body 261. In more detail, a center of a curved track, which corresponds to at least part of the curved surface forming the first arm 262, may be formed within the main body 261. In addition, the center of the curved track may generally match a center of the sphere forming the main body 261.

Still referring to FIG. 2, the second arm 263 may be formed in a curved shape to surround at least part of the first arm 262. In more detail, a center of a curved track, which corresponds to at least part of the curved surface forming the second arm 263, may be formed within the main body 261. In addition, the center of the curved track may generally match a center of the sphere forming the main body 261.

In addition, "generally matching" disclosed herein refers to not only the relationship that two centers exactly match each other but also the relationship that the two centers are disposed with an error of less than a preset angle. In addition, the second arm 263 may be longer in length than the first arm 262, to fully surround one surface of the first arm 262.

To summarize, since the first arm 262 surrounds the main body 261 and the second arm 263 surrounds the first arm 262, the main body 261 and the first and second arms 262 and 263 can be disposed sequentially from inside to outside of the camera module 200. Also, the centers of the curved surfaces forming the first and second arms 262 and 263 are all disposed within the spherical main body 261, which allows a user to feel that the camera module 200 generally has appearance in the spherical shape.

In addition, the fixing member 264 supports the main body 261 and the first and second arms 262 and 263. Further, the fixing member 264 may be gripped by the user or fixed to an external object. The drawing shows that the fixing member 264 is formed in a bar-like shape. However, the shape of the fixing member 264 is not limited to this and can have various shapes.

Hereinafter, the coupling relationship among the main body 261, the first and second arms 262 and 263 and the fixing member 264 will be described with reference to FIG. 3. In particular, FIG. 3 is a disassembled view of the camera module in accordance with one embodiment of the present invention.

Figure 3:
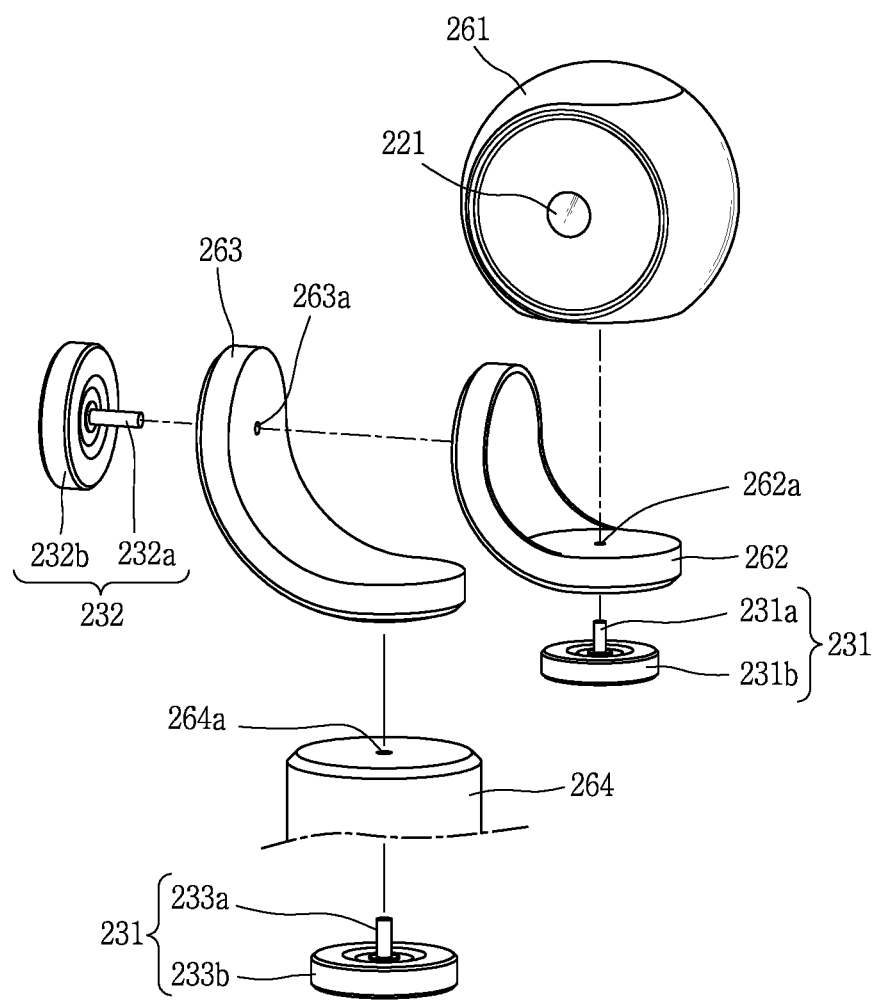
FIG. 3 is a disassembled view of the camera module according to one embodiment of the present invention.

As illustrated in FIG. 3, the first arm 262 may include a first motor 231 for rotating the main body 261. In more detail, the first motor 231 may be provided with a first motor body 231b, and a first rotation shaft 231a coupled to the first motor body 231b. In this instance, the first arm 262 may be provided with a first through hole 262a through which the first rotation shaft 231a is inserted.

In other words, the first motor body 231b is disposed within the first arm 262, and the first rotation shaft 231a is externally exposed through the first through hole 262a. A part of the externally-exposed first rotation shaft 231a may be coupled to the camera main body 261. With this configuration, a rotation force transferred by the first motor 231 allows the main body 261 to be rotated centering on the first rotation shaft 231a.

Referring still to FIG. 3, the second arm 263 may include a second motor 232 for rotating the first arm 262. In more detail, the second motor 232 may be provided with a second motor body 232b, and a second rotation shaft 232a coupled to the second motor body 232b. In this instance, the second arm 263 includes a second through hole 263a through which the second rotation shaft 232a is inserted.

In other words, the second motor body 232b is disposed within the second arm 263, and the second rotation shaft 232a is externally exposed through the second through hole 263a. A part of the externally-exposed second rotation shaft 232a is also coupled to the first arm 262.

In this instance, the externally-exposed second rotation shaft 232a can be fixed to the first arm 262 by being generally perpendicular to at least part of the surface forming the first arm 262. With this configuration, a rotation force transferred by the second motor 232 allows the first arm 262 to be rotated centering on the second rotation shaft 232a.

In addition, a position at which the second rotation shaft 232a is coupled on the first arm 262 may be different from a position at which the first through hole 262a is formed. In more detail, the second and first rotation shafts 232a and 231a may be connected to the first arm 262 in a manner that a virtual axis corresponding to the second rotation shaft 232a is generally perpendicular to a virtual axis corresponding to the first rotation shaft 231a inserted through the first through hole 262a.

Still referring to FIG. 3, the fixing member 264 may include a third motor 233 for rotating the second arm 263. In more detail, the third motor 233 includes a third motor body 233b, and a third rotation shaft 233a coupled to the third motor body 233b. In this instance, the fixing member 264 includes a third through hole 264a through which the third rotation shaft 233b is inserted.

In other words, the third motor body 233b is disposed within the fixing member 264, and the third rotation shaft 233a is externally exposed through the third through hole 264a. A part of the externally-exposed third rotation shaft 233a is also coupled to the second arm 263.

In this instance, the externally-exposed rotation shaft 233a may be fixed to the second arm 263 by being generally perpendicular to at least part of the surface forming the second arm 263. With this configuration, a rotation force transferred by the third motor 233 allows the second arm 263 to be rotated centering on the third rotation shaft 233a.

In addition, a position at which the third rotation shaft 233a is coupled on the second arm 263 may be different from a position at which the second through hole 263a is formed. In more detail, the third and second rotation shafts 233a and 232a may be connected to the second arm 263 in a manner that a virtual axis corresponding to the third rotation shaft 233a is generally perpendicular to a virtual axis corresponding to the second rotation shaft 232a inserted through the second through hole 263a.

To summarize, the first, second and third motors 231, 232 and 233 can independently rotate the main body 261 and the first and second amines 262 and 263 centering on different orthogonal shafts, respectively, within a three-dimensional space.

Hereinafter, description will be given of changes in states of the camera module 200, with reference to FIGS. 2, 4A and 4B, in order to explain a forward rotation of the camera module 200. In particular, FIG. 2 is a view illustrating that the camera module 200 is arranged in a first state and FIGS. 4A and 4B are views illustrating that the camera module 200 is arranged in a second state in accordance with an embodiment of the present invention.

Figure 4A:
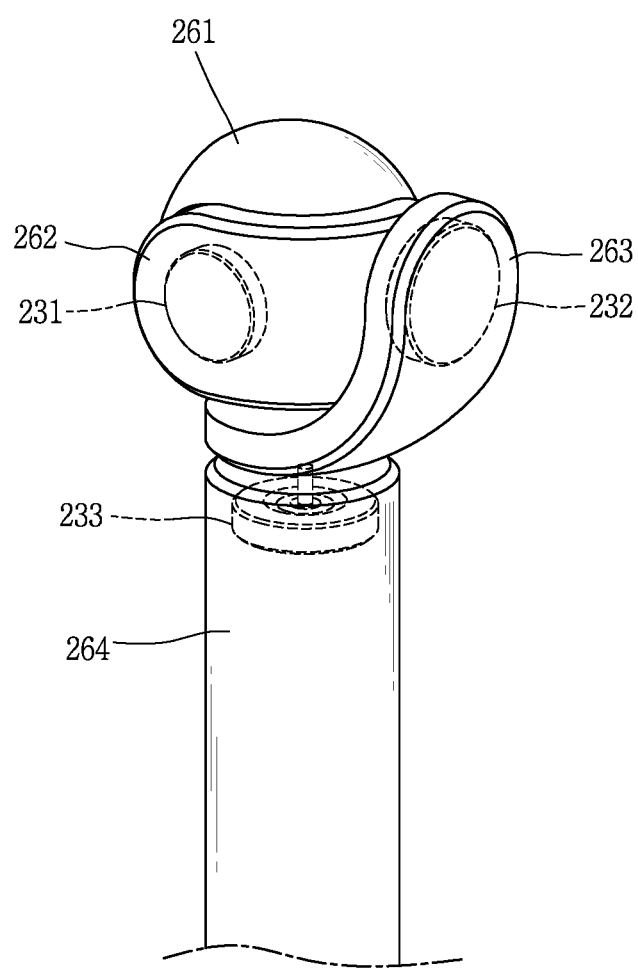
FIGS. 4A and 4B are views illustrating that the camera module is arranged in a second state according to an embodiment of the present invention.
Figure 4B:
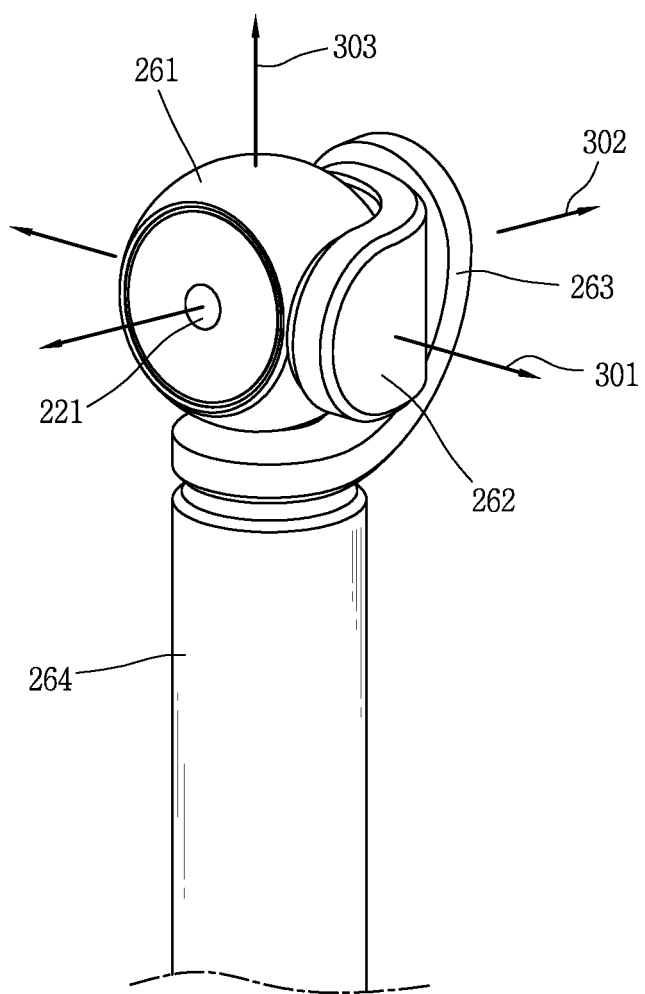

In more detail, FIG. 4A is a front perspective view of the camera module 200 arranged in the second state, and FIG. 4B is a rear perspective view of the camera module 200 arranged in the second state. Referring to FIG. 2, the first and second arms 262 and 263 of the camera module 200 may be overlaid by each other in the first state.

Accordingly, in the first state, the first rotation shaft 231a of the first motor 231 disposed in the first arm 262 and the third rotation shaft 233a of the third motor 233 disposed in the fixing member 264 may be arranged on the same line within a three-dimensional space. Referring to FIGS. 4A and 4B, the first and second arms 262 and 263 of the camera module 200 may intersect with each other in the second state.

In this instance, the first rotation shaft 231a of the first motor 231 disposed in the first arm 262 and the third rotation shaft 233a of the third motor 233 disposed in the fixing member 264 may intersect with each other in the three-dimensional space.

In more detail, referring to FIG. 4B, the first to third rotation shafts 231a, 232a and 233a of the first to third motors 231, 232 and 233 according to an embodiment of the present invention may be arranged to correspond respectively to different axes 301, 302 and 303, which are orthogonal to one another.

Accordingly, in the second state, the first to third motors 231, 232 and 233 can independently rotate the main body 261 and the first and second arms 262 and 263, respectively, centering on the different orthogonal axes within the three-dimensional space. Therefore, the camera 221 mounted to the main body 261 can perform image capturing in an omnidirectional manner.

In addition, the change between the first and second states of the camera module 200 may be performed based on a user request associated with the state change. In more detail, while the camera module 200 is placed in the first state as illustrated in FIG. 2, when the user request is input, the second motor 232 may rotate the first arm 262 in one direction approximately by a right angle (90°) such that the first and second arms 262 and 263 generally intersect with each other. Accordingly, as illustrated in FIG. 4A, the camera module 200 may be arranged in the second state.

Similarly, while the camera module 200 is placed in the second state as illustrated in FIG. 4A, when the user request is input, the second motor 232 can rotate the first arm 262 approximately by a right angle in an opposite direction to the one direction, such that the first and second arms 262 and 263 are generally overlaid by each other. Accordingly, as illustrated in FIG. 2A, the camera module 200 can be arranged in the first state.

In addition, the user request may be input through a user input unit provided on the camera module 200. For example, the user input unit may include a key (a touch key or a push key) associated with the state change. Alternatively, the user request may be input based on a signal transmitted from the mobile terminal 100 which is wirelessly connected to the camera module 200.

In more detail, the mobile terminal 100 may have an installed application associated with the camera module 200. An execution screen of the application may include a virtual button associated with the state change of the camera module 200. A signal for changing the state of the camera module 200 may be generated in response to a touch applied to the virtual button.

Hereinafter, various capturing modes of the camera module 200 according to an embodiment of the present invention will be described with reference to the drawings. In particular, FIGS. 5A and 5B are conceptual views illustrating a subject tracking mode and FIGS. 6A and 6B are conceptual views illustrating a capturing direction setting mode in accordance with an embodiment of the present invention.

Figure 5A:
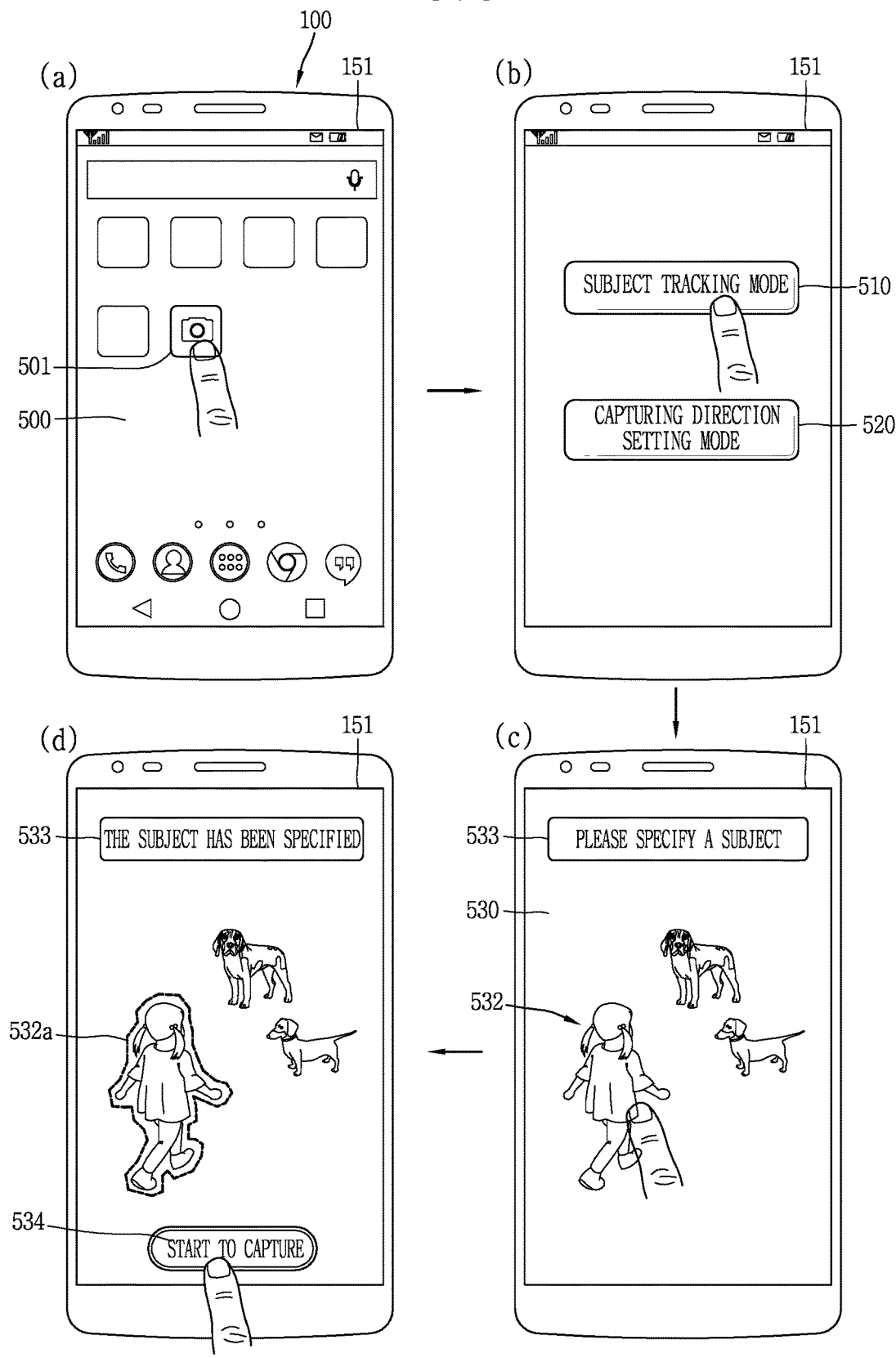
FIGS. 5A and 5B are conceptual views illustrating a subject tracking mode according to an embodiment of the present invention.
Figure 5B:
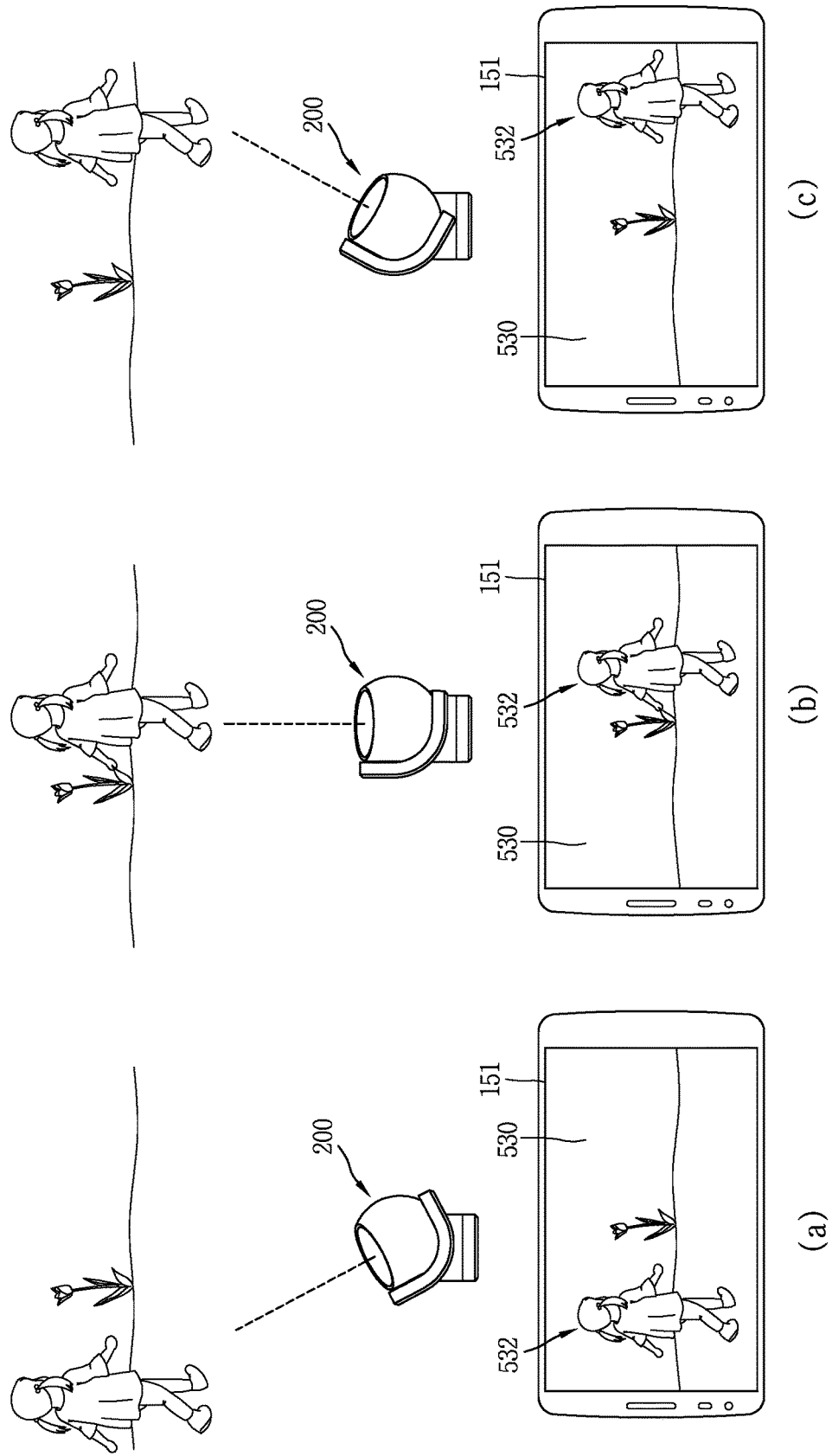
Figure 6A:
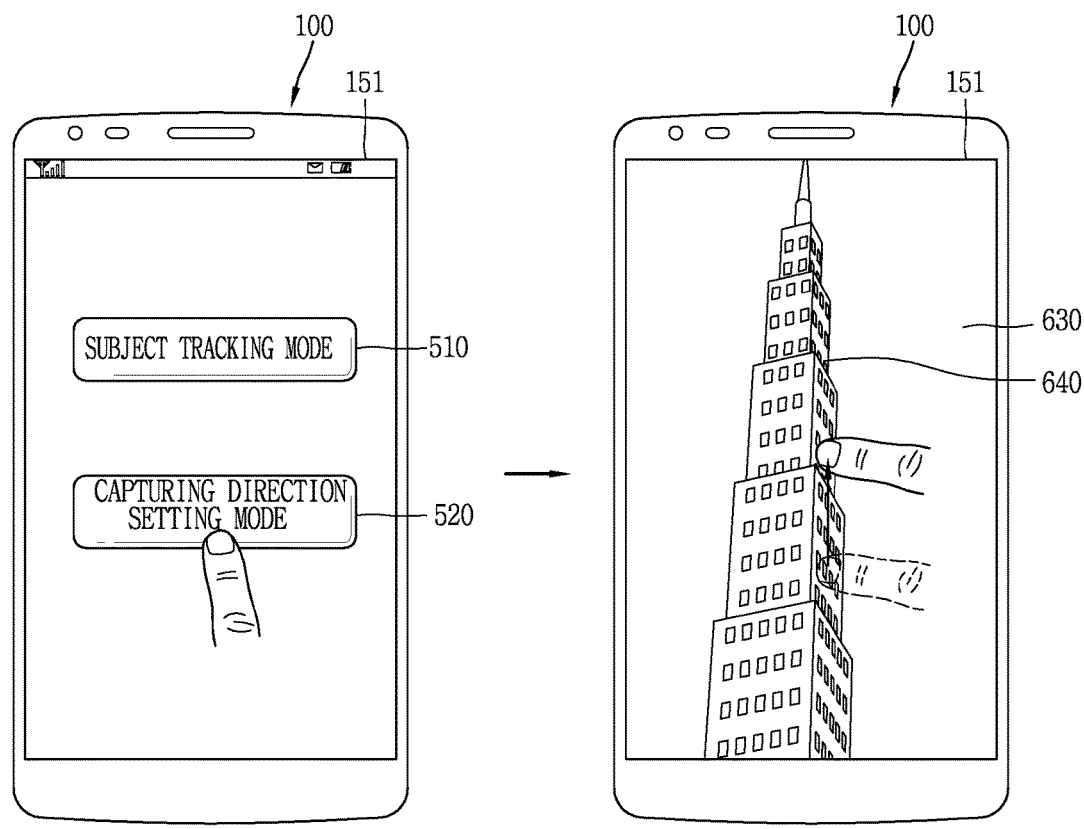
FIGS. 6A and 6B are conceptual views illustrating a capturing direction setting mode according to an embodiment of the present invention.
Figure 6A:
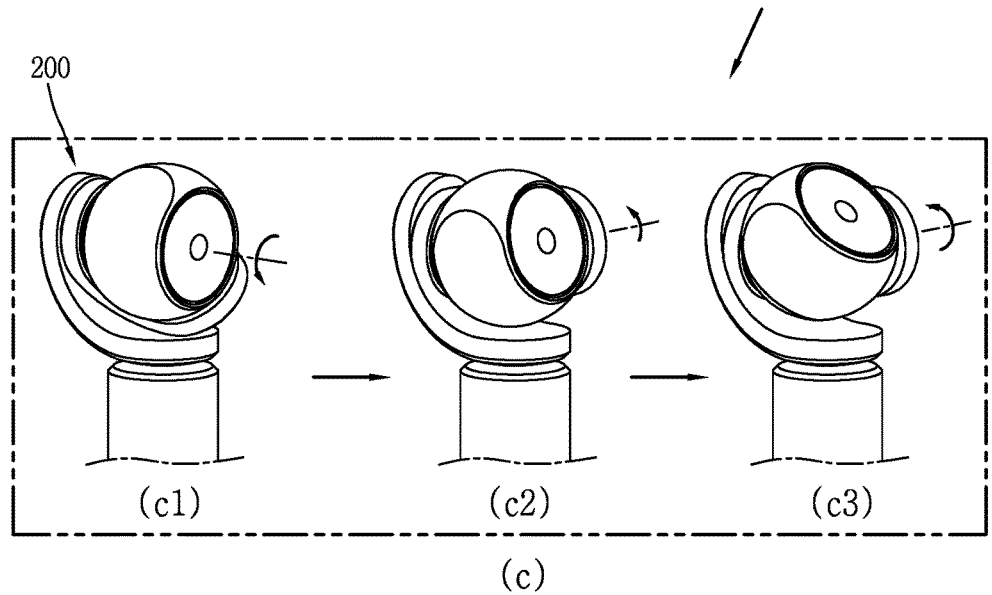
Figure 6B:
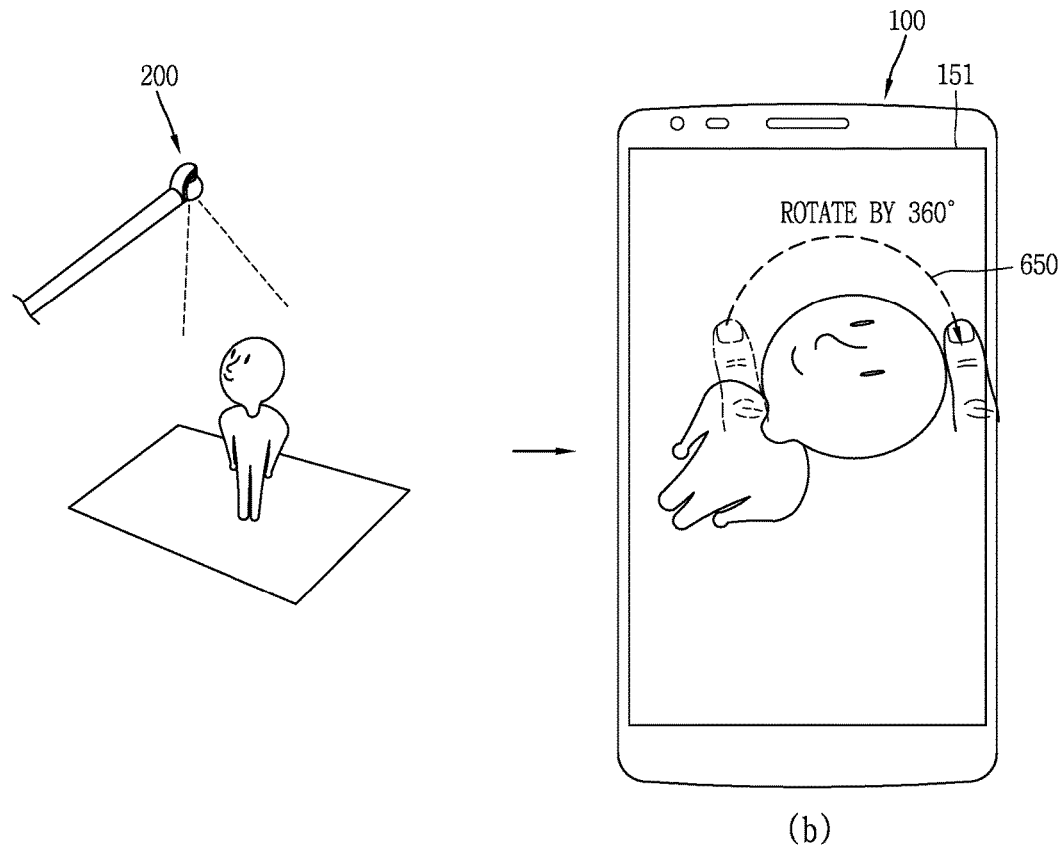
Figure 6B:
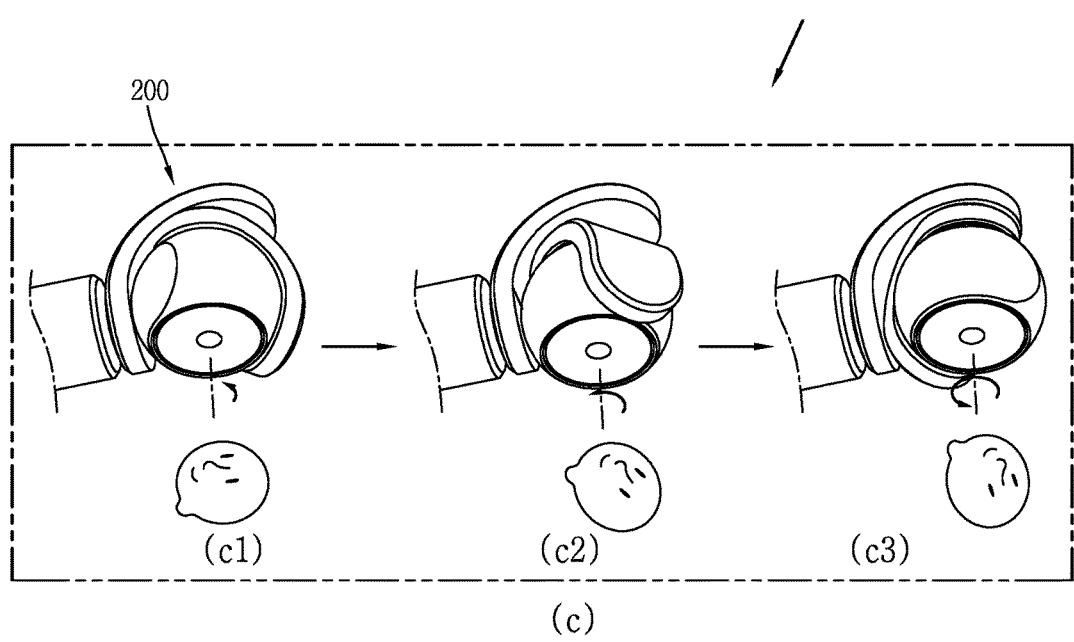

As illustrated in (a) of FIG. 5A, the aforementioned application associated with the camera module 200 may be installed on the mobile terminal 100. In this instance, a home screen 500 which is output on a display unit 151 of the mobile terminal 100 may include an icon 501 corresponding to the application.

As illustrated in (a) and (b) of FIG. 5A, when a touch input is applied to the icon 501, an execution screen of the application can be output on the display unit 151. The execution screen may include virtual buttons 510 and 520 associated with 'subject tracking mode' and 'capturing direction setting mode,' respectively.

As illustrated in (b) and (c) of FIG. 5A, when a touch input is applied to the virtual button 510 corresponding to the 'subject tracking mode,' an image 530 input by the camera module 200 can be output on the display unit 151 in real time. The display unit 151 can also output a guide message 531 for guiding the user to designate (specify, set) a subject, in addition to the image 530.

As illustrated in (c) and (d) of FIG. 5A, a subject which is to be tracked by the camera module 200 can be specified (designated), in response to a touch input applied to an image of the subject included in the image 530. Here, the subject may refer to a person or thing which can be captured. Also, the subject may be a single one or in plurality.

In more detail, the controller can specify a subject included within a preview image based on a preset method. The preset method can recognize a person or a thing by using contour information or color information related to the person or thing, which is distinguished from the other areas within the preview image.

For example, the preset method may be a preset face recognition algorithm for recognizing a face of a subject according to a ratio of distances among eyes, a nose and a mouth, which are major portions of the face. Also, a controller can specify the subject based on a touch input sensed on the display unit 151, in addition to the preset method. For example, the controller can specify a subject corresponding to a graphic object, which is included in a track of a touch input, when the touch input applied by the user is sensed on the display unit 151.

As illustrated in (d) of FIG. 5A, when the subject is specified, a graphic object 532*a* for indicating the specified subject can be output on the display unit 151. That is, as illustrated, the graphic object 532*a* may be output in a shape of a line which limits a boundary of an image of the specified subject.

Still referring to (d) of FIG. 5A, when the subject is completely specified, a guide message 533 notifying the completion of the specification of the subject can be output on the display unit 151. A virtual button 534 corresponding to a start of image capturing by the camera module 200 can be output on the display unit 151. That is, when a touch is applied to the virtual button 534, the camera module 200 may operate in a mode of tracking the specified subject.

The forgoing description has been given of the configuration that the image input by the camera module 200 is output on the display unit 151 disposed on the mobile terminal 100. However, the present invention is not limited to this. The image may alternatively be output on the display module 251 of the camera module 200. In this instance, a process of transmitting the image from the camera module 200 to the mobile terminal 100 may be omitted.

Hereinafter, the camera module 200 operating in the subject tracking mode will be described, with reference to FIG. 5B. Here, (a), (b) and (c) of FIG. 5B illustrate the operations of the camera module 200 according to a lapse of time. The controller disclosed herein can analyze the image 530 which is input through the camera module 200 in real time. Here, the controller may refer to the controller of the mobile terminal 100 or the controller 280 of the camera module 200.

Referring to FIG. 5B, when a change in a position of a specific subject image 532 included in the image 530 is sensed, the controller can control the first to third motors 231, 232 and 233 to rotate at least one of the main body 261 and the first and second arms 262 and 263, such that the specific subject image 532 are continuously included within the image 530.

This facilitates the tracking of the specific subject by the camera module 200. In addition, the camera module 200 can perform capturing in the omnidirectional manner, which results in successfully tracking the specific subject even though the specific subject moves in any direction.

Hereinafter, the capturing direction setting mode according to an embodiment of the present invention will be described with reference to FIGS. 6A and 6B. As illustrated in (a) of FIG. 6A, an execution screen of an application associated with the camera module 200 can be output on the mobile terminal 100 according to an embodiment of the present invention. The execution screen may include the virtual buttons 510 and 520 corresponding to 'subject tracking mode' and 'capturing direction setting mode,' respectively.

As illustrated in (a) and (b) of FIG. 6A, when a touch input is applied to the virtual button 520 for executing the 'capturing direction setting mode,' an image 630 input through the camera module 200 is output on the display unit 151. In addition, a message for inducing a touch input for setting a capturing direction may also be output together with the image 630.

As illustrated in (b) of FIG. 6A, the controller may generate information related to the capturing direction of the camera module 200, in response to a touch 640 applied to the display unit 151 while the image 630 is output on the display unit 151. In more detail, the touch 640 may be a drag touch. Information related to a rotation range and a rotating direction of the camera module 200 may be generated based on a direction and a length of a track corresponding to the drag input.

As illustrated in (c) of FIG. 6A, when the information related to the capturing direction of the camera module 200 is received, the controller 280 can control at least one of the first to third motors 231, 232 and 233 to rotate at least one of the main body 261 and the first and second arms 262 and 263, such that capturing through the camera can be performed in the capturing direction.

For example, (c1), (c2) and (c3) of FIG. 6A illustrate that the second motor 232 provided in the second arm 263 and the first motor 231 provided in the first arm 262 are driven and accordingly the main body 261 and the first arm 262 are rotated, such that capturing is performed in the capturing direction.

As another example, referring to (a) of FIG. 6B, the camera module 200 disclosed herein may be arranged in a direction that the camera 221 faces the ground. In this instance, the state that the camera 221 is arranged to face the ground may be sensed by a G-sensor included in the sensing unit 240.

As illustrated in (b) and (c) of FIG. 6B, an image input through the camera module 200 can be output on the display unit 151. Also, when a drag touch 650 corresponding to a curved track is applied to the display unit 151, the controller of the terminal can generate information related to a capturing direction corresponding to the curved track and transmit the generated information to the camera module 200.

As illustrated in (c1), (c2) and (c3) of FIG. 6B, when the information related to the capturing direction is received, the controller 280 can control the second motor 232 to be rotated. Accordingly, the first arm 262 can be rotated in response to the rotation of the second motor 232 such that capturing can be performed in the capturing direction.

Also, when a panoramic image capturing mode is executed while the fixing member 264 is arranged to be generally perpendicular to the ground, the third motor 233 provided in the fixing member 264 may be rotated and accordingly the second arm 263 may be rotated.

In this instance, the first arm 262 and the main body 261 connected to the second aim 263 may not be rotated with respect to the second aim 263. That is, the other components of the camera module 200 except for the fixing member 264 can be rotated with respect to the fixing member 264, thereby executing the panoramic image capturing mode.

Further, virtual buttons for adjusting a capturing speed may be included in the execution screen of the application associated with the camera module 200. In more detail, the virtual buttons may include detailed virtual buttons for adjusting the rotating speeds of the main body 261 and the first and second arms 262 and 263, respectively. Accordingly, the rotating speeds of the main body 261 and the first and second arms 262 and 263 may be adjusted in an independent manner.

So far, the camera module 200 which can perform capturing in the omnidirectional manner by rotating the main body 261 and the first and second arms 262 and 263 in response to the rotation of the first to third motors 231, 232 and 233. Hereinafter, a control method of compensating for shaking of (or stabilizing) the fixing member 264 will be described.

The first and second sensing portions 241 and 242 (FIG. 1) may be provided on the main body 261 and the fixing member 264, respectively. The first and second sensing portions 241 and 242 may sense motions of the main body 261 and the fixing member 264, respectively. In more detail, the first and second sensing portions 241 and 242 may measure angular speeds with respect to the different axes 301, 302 and 303 (see FIG. 4B) orthogonal to one another within the three-dimensional space, respectively.

The controller 180 can control the first to third motors 231, 232 and 233 to be rotated respectively by first to third speeds, which are calculated based on the measurement values sensed by the first and second sensing portions 241 and 242. In more detail, the first to third speeds may be values associated with a value which is object by subtracting the measurement value sensed by the second sensing portion 242 from the measurement value sensed by the first sensing portion 241.

Accordingly, the camera module 200 can acquire a more stable image for which the shaking of the fixing member 264 has been compensated.

According to an embodiment of the present invention, the first arm can surround the main body in the spherical shape and the second arm can surround the first arm, thereby providing the camera module in a compact size. Also, the centers of the curved surfaces forming the first and second arms, respectively, can be arranged within the spherical main body, which provides a user with a feeling like the camera module has appearance generally in the spherical shape. That is, the camera module can be provided with an improved appearance.

The first to third motors allows the main body and the first and second arms to be independently rotated with respect to the different axes orthogonal to one another within the three-dimensional space. This results in implementing omnidirectional image capturing through the camera mounted to the main body.

The camera module according to an embodiment of the present invention can provide the subject tracking mode and the capturing direction setting mode, thereby allowing the user to use the camera module more conveniently.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A camera module comprising:
 a main body having a spherical shape and including a camera;
 a first arm connected to the main body and including a first motor configured to rotate the main body;
 a second arm connected to the first arm and including a second motor configured to rotate the first arm;

a fixing member connected to the second arm and including a third motor for rotating the second arm; and
a controller configured to independently rotate the main body, the first arm and the second arm to allow omnidirectional capturing in a three-dimensional space where the camera is placed,
wherein the first arm and the second arm have curved surfaces surrounding at least part of the main body and at least part of the first arm, respectively, and
wherein a center of a curved track corresponding to at least part of each of the curved surfaces matches a center of the main body.

2. The camera module of claim 1, wherein the second arm is longer in length than the first arm such that the second arm fully surrounds an outer surface of the first arm.

3. The camera module of claim 1, wherein a position at which a rotation shaft of the second motor is coupled on the first arm is different from a position at which a first through hole for insertion of a rotation shaft of the first motor therethrough is formed, and
wherein the rotation shaft of the second motor is coupled to the first arm in a manner that an axis corresponding to the rotation shaft of the second motor is substantially perpendicular to an axis corresponding to the rotation shaft of the first motor.

4. The camera module of claim 1, wherein the controller is further configured to rotate the first arm and the second arm between a first state of being overlaid by each other and a second state of intersecting with each other, in response to a user request being input for changing a state of the camera module.

5. The camera module of claim 4, wherein rotation shafts of the first to third motors are arranged to correspond to different axes within the three-dimensional space in the second state, the different axes being orthogonal to one another.

6. The camera module of claim 1, wherein the controller is further configured to control the first to third motors to rotate at least one of the main body, the first arm and the second arm, such that a specific subject image is continuously included in an image input through the camera in real time.

7. The camera module of claim 6, further comprising:
a wireless communication processor configured to perform data transmission and reception with an external device,
wherein the controller is further configured to control at least one of the first to third motors to rotate at least one of the main body, the first arm and the second arm, such that capturing through the camera is performed in a specific capturing direction, when information related to the specific capturing direction is received from the external device.

8. The camera module of claim 7, wherein the external device comprises a mobile terminal.

9. The camera module of claim 8, wherein the information related to the specific capturing direction corresponds to a touch and drag performed on a screen of the mobile terminal.

10. The camera module of claim 8, wherein the specific subject image is selected via a graphic user interface on the mobile terminal.

11. The camera module of claim 1, further comprising:
first and second sensing portions provided in the main body and the fixing member, respectively, and configured to sense motions of the main body and the fixing member, respectively,
wherein the controller is further configured to control the first to third motors to be rotated by first to third speeds, the first to third speeds calculated based on measurement values sensed by the first and second sensing portions.

12. A method of controlling a camera module via an external mobile terminal, the method comprising:
displaying an image captured by the camera module on a display of the external mobile terminal;
receiving a specific touch input on an object included in the image displayed on the display of the external mobile terminal; and
transmitting a control signal to the camera module from the external mobile terminal to independently rotate a main body, a first arm and a second arm of the camera module to allow omnidirectional capturing in a three-dimensional space where the camera module is placed,
wherein the main body has a spherical shape and a camera, a first arm connected to the main body and including a first motor configured to rotate the main body, a second aim connected to the first arm and including a second motor configured to rotate the first arm; and a fixing member connected to the second arm and including a third motor for rotating the second arm,
wherein the control signal controls the first to third motors to rotate at least one of the main body, the first arm and the second arm, such that a specific subject image is continuously included in an image input through the camera in real time,
wherein the control signal controls at least one of the first to third motors to rotate at least one of the main body, the first arm and the second arm, such that capturing through the camera is performed in a specific capturing direction, when information related to the specific capturing direction is received from the external mobile terminal,
wherein the information related to the specific capturing direction is generated based on a direction and a length of a track corresponding to a drag input, and
wherein the drag input is an input performed on a screen of the mobile terminal.

13. The method of claim 12, wherein the first arm and the second arm have curved surfaces surrounding at least part of the main body and at least part of the first arm, respectively.

14. The method of claim 13, wherein a center of a curved track corresponding to at least part of each of the curved surfaces is located within the main body.

15. The method of claim 12, wherein the second arm is longer in length than the first arm such that the second arm fully surrounds one surface of the first arm.

* * * * *